Aug. 20, 1940.  G. NAKAHIRO  2,211,907
FLOUR SIFTER
Filed July 21, 1939  2 Sheets-Sheet 1

INVENTOR.
GENZO NAKAHIRO,
BY Edward C. Healy
ATTORNEY.

Aug. 20, 1940.　　　　G. NAKAHIRO　　　　2,211,907
FLOUR SIFTER
Filed July 21, 1939　　　　2 Sheets-Sheet 2
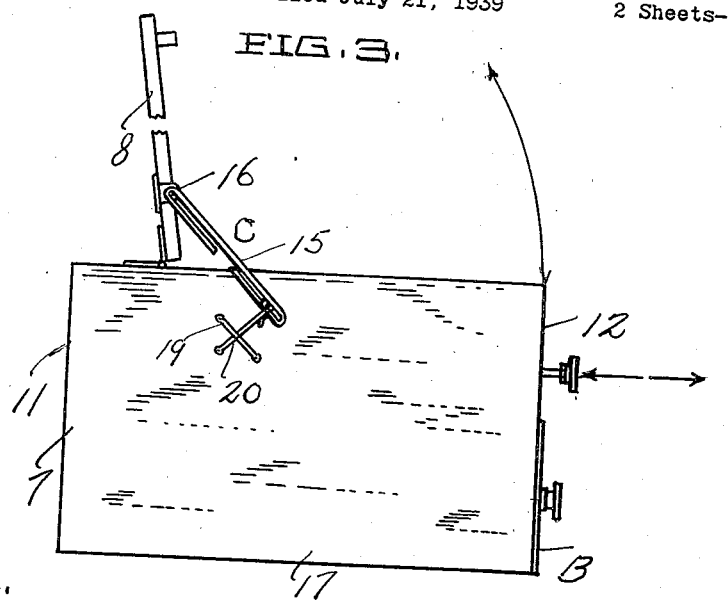
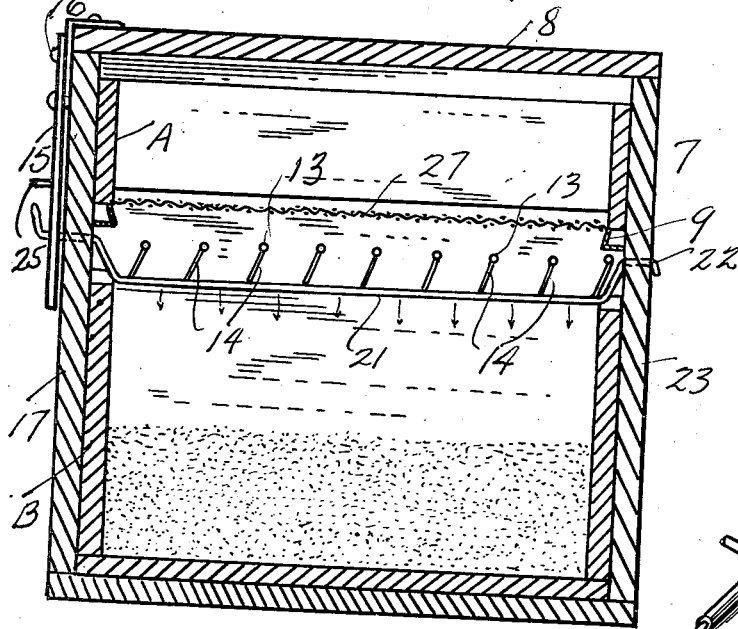
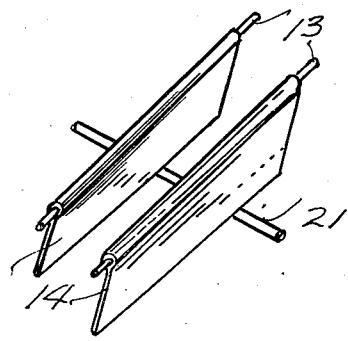
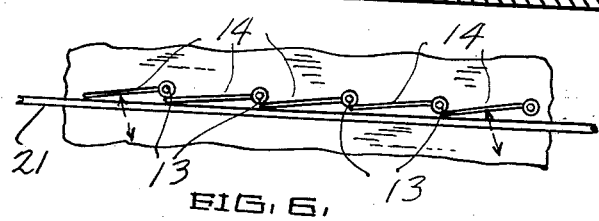
INVENTOR.
GENZO NAKAHIRO.
BY
Edward C Healy
ATTORNEY.

Patented Aug. 20, 1940

2,211,907

UNITED STATES PATENT OFFICE 2,211,907

FLOUR SIFTER

Genzo Nakahiro, San Francisco, Calif.

Application July 21, 1939, Serial No. 285,675

8 Claims. (Cl. 209—242)

This invention relates to improvements in flour sifters and has particular reference to a portable sifter that has for its principal object the provision of means for causing the sifter flour to be passed to a storage bin by virtue of a unique operating mechanism.

An additional object of the invention is to provide in the container a sieve that can be agitated while positioned in the container and a bin wherein the sifted flour can be stored until it is desired to use the same.

A further object of the invention is to provide a sifter that is economical in construction, durable, positive in operation, and highly efficient in use.

Other objects and advantages will be apparent during the course of the following description.

In the accompanying drawings forming a part of this specification and in which like numerals are employed to designate like parts throughout the same, Fig. 1 is a side elevation of the sifter, partly in section, disclosing to advantage the mechanism for actuating a plurality of plates, the agitator or sieve, and the bin for receiving the sifted flour;

Fig. 3 is a side elevation of the sifter, showing the lid in a raised position and the mechanism for operating the plates;

Fig. 4 is a transverse section, the view being taken on the line 4—4 of Fig. 1;

Fig. 5 is a perspective view, showing the construction of certain of the plates employed in the invention; and Fig. 6 is a sectional detail of the plates, showing the same in closed position.

Figure 1:
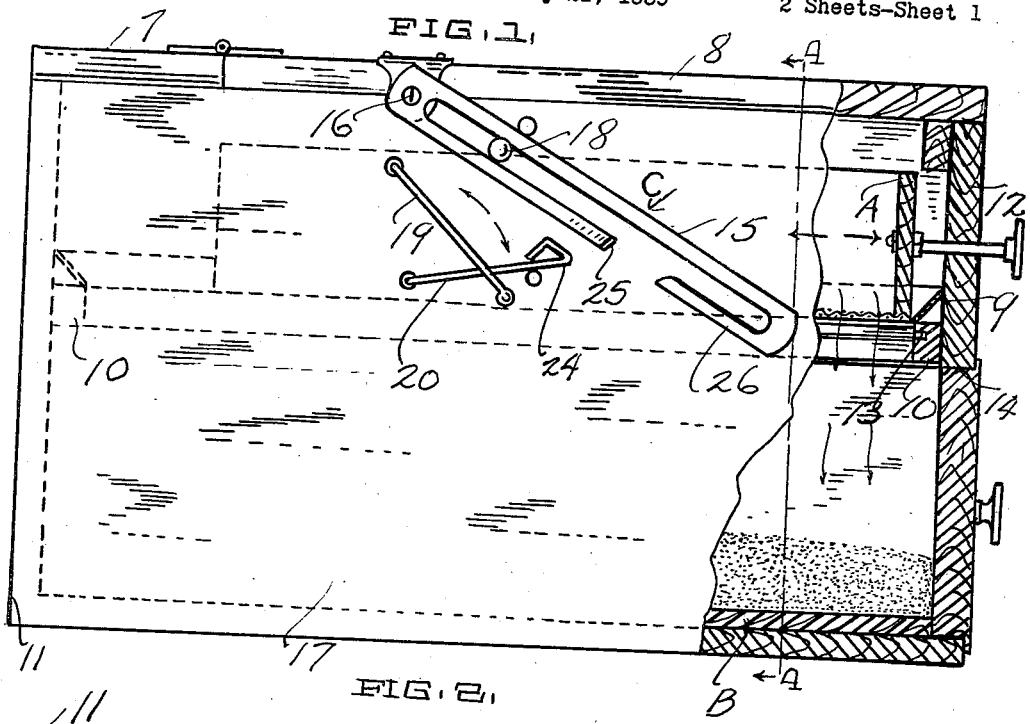

There are many types of sifters now on the market, some of the hand actuated type; but, to my knowledge, I am the first to employ in a portable sifter the features of agitating the flour to cause a sifting action and a distinctive mechanism that cooperates with the lid when it is lowered or raised to actuate the retaining plates, whereby the sifted flour is passed to the storage bin.

In the accompanying drawings wherein for the purpose of illustration is shown a preferred embodiment of my invention, the numeral 7 designates a receptacle of a substantially rectangular form that is equipped with a hinged lid 8. Beneath said lid and within the body of the receptacle 7 there is placed a metallic frame 9 that is supported on a pair of end strips 10 that are nailed or otherwise secured to the end walls 11 and 12 of the receptacle. The said strips 10 have secured thereto ends of spaced rods 13, each of which has pivotally mounted thereon a plate 14. The said plates are preferably nine in number and when moved to a substantially horizontal position, as will be hereinafter explained, provide a continuous surface and retain thereon the flour sifted from a sieve or agitator A; and when moved to a substantially vertical position, permit the sifted flour to pass therebetween to a storage bin B in the form of a drawer that is slidable in said receptacle.

Referring again to said plates, the same when in a substantially vertical position prevent a withdrawal of the drawer or bin, and when in a raised position, allow the drawer to pass through the opening 14' formed in the end wall 12 so that the stored flour may be either repeatedly sifted, or if the necessary degree of fineness is present, the said flour can be used for the desired purpose. Accordingly, it will be obvious that when the lid is in its open or raised position, the flour holding drawer can be readily removed because of the horizontal position of the plates; and when the lid is closed, the drawer is locked against movement because of the contact of the rear wall of the drawer against the depending plates.

When the lid is manually raised or lowered, a unique mechanism is employed to cause an opening and closing of the plates. The said mechanism is designated as a whole by the reference character C and embodies in its construction a slotted link 15 which has its upper end hingedly mounted as at 16 to one edge of the lid 8 and is slidable with relation to the side wall 17 of the receptacle. A stud or like guiding element 18 is mounted in the side of the container and is positioned within the link and serves to guide the link 15 in its upward and downward movement.

The numeral 19 designates a bail for an extension 20 of a crank 21 that is positioned horizontally in the container and at right angles with relation to said plates and below the latter. The opposite end of the crank is secured as at 22 to the opposite side wall 23 or the container. The link 15 has a lost motion connection with extension 20, whereby plates 14 will not be moved to substantially horizontal position, and hence permit withdrawal of bin B, until lid 8 has been opened to a substantial degree. It will be noted that the extension 20 is provided with a bent extremity 24 in the form of a loop over which an inclined lug or outwardly projecting part 25 of the link rides during the downward movement of the link, while a hook 26 formed in the link is adapted to be received in the loop of the extension 20 upon the raising of the lid to thus cause the crank to contact the undersurfaces of the spaced plates to thus move the same to a substantially horizontal position and to provide the continuous retaining surface, before referred to. During closing of the lid or closure 8 from the raised position shown in Fig. 3, lug 25 of link 15 engages loop 24 and thus moves crank 21 downwardly from plates 14, which are thus free to swing under the influence of gravity to the spaced or open position shown in Fig. 4 and thus permit sifted flour to pass between the plates to the bin.

Figure 2:
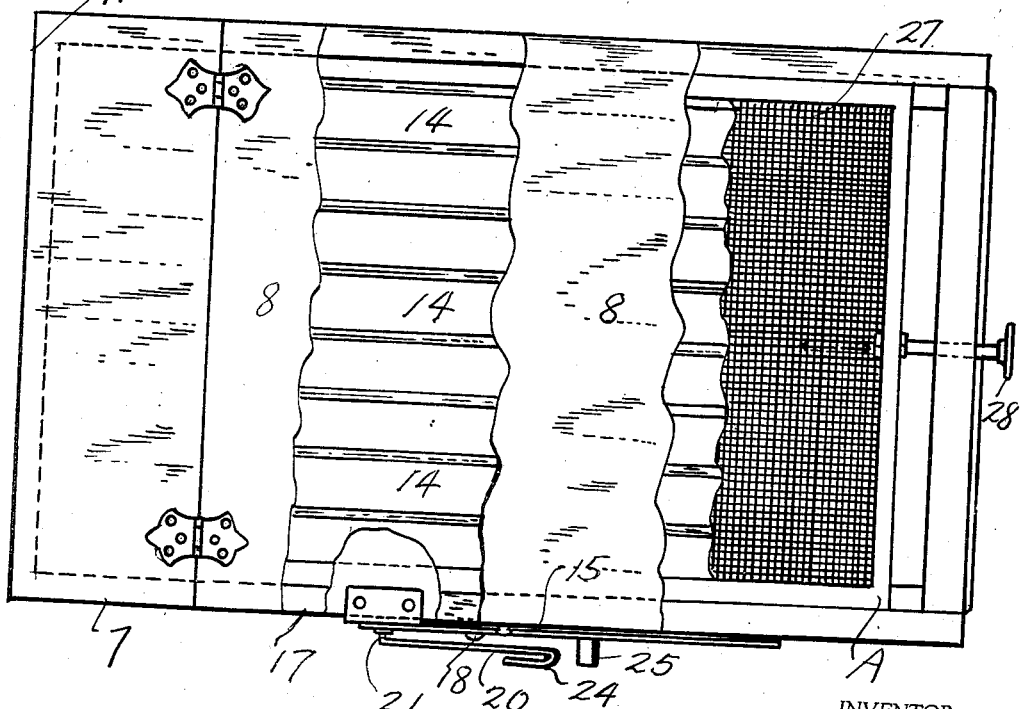
Fig. 2 is a plan view of the receptacle, partly broken away to disclose the interior construction of the same and the cooperating elements.

The sieve or agitator, as disclosed to advantage in Figs. 1 and 2, is of a substantially rectangular form and is equipped with a screened bottom 27 and an operating handle 28 that extends through the front wall of the receptacle or container 7. It is within this sieve that the flour is first poured for the purpose of sifting the same. It is obvious that the sieve may be readily actuated by virtue of the handle that extends through the front wall. It is also clear that, due to the horizontal or closed position of plates 14 enforced while lid 8 is open as in Fig. 3, flour poured into the sieve and passing through screen 27 is retained on the partition wall formed by the plates, and hence the flour is prevented from passing downwardly beyond the plates.

The sifting action may be repeated as many times as desired until the operator deems that the flour has reached its desired degree of fineness. Such repeated sifting is common in the art of baking and is obviously facilitated by my invention, which compels closing of the plates 14 so as to form a partition wall, while bin or drawer B is being withdrawn from the container 7 and the sifted flour in the bin is being poured therefrom into the sieve A for further sifting, and which requires return of the bin B into the container while plates 14 remain in the horizontal or closed wall-forming position.

In the use of my sifter, lid 8 is raised to permit pouring of flour into sieve A, the raising of the lid causing closing of the plates 14 in the horizontal position so as to form a wall substantially impervious to passage of flour, so that flour passing through screen 27 during pouring of flour into the sieve is retained on such wall. If bin B is not already in place below plates 14, it is inserted in the container before closure 8 is lowered to close the inlet to the sieve, since bin B may be inserted in place only while plates 14 are in the horizontal position corresponding to the raised position of the closure. The lid is then closed; this causes release of plates 14 which consequently assume an open or spaced vertical position, whereby flour accumulated thereon during the pouring will fall into the bin below. The sieve is then agitated so that the flour sifts through the screen and passes between the plates 14 downwardly into the bin. If desired, the sifted flour may be stored in the bin for subsequent use and it is noted that bin B can not accidentally fall out of the container 7 since the bin may be withdrawn only after opening of the closure 8, because of the locking action of plates 14 which extend into the bin when they are in their open position corresponding to the closed or normal position of the closure. If, however, repeated sifting is desired, then the lid 8 is raised, thus enforcing movement of plates 14 to the horizontal or closed position, bin B is withdrawn and the sifted flour therein is poured into the sieve A, bin B is returned in place below the partition wall provided by plates 14, the lid is closed, and the sieve is again agitated. It is noted that, during such repeated sifting, flour can not pass down into the space provided for the bin B until the operator has had the opportunity of replacing the bin in position to receive the sifted flour, and that flour will not pass into such space during the pouring of the previously sifted flour from the withdrawn bin into the sieve. It is clear, therefore, that the plates 14 constitute means for controlling the passage of material from the sieve to the bin and for preventing withdrawal of the bin while the material may pass into the space provided for the bin, that the crank means 20—21 controls and actuates the plates 14, and that linkage mechanism C controls and actuates the crank 20 means, this mechanism C being in turn controlled and actuated by movements of the closure or lid 8.

From the foregoing description considered in connection with the accompanying drawings, it will be obvious that I have devised a unique type of sifter, wherein sifted flour may be stored for subsequent use and wherein repeated sifting of flour is facilitated by an automatically controlled openable partition wall located between the sieve and the storage bin, which feature is not present in the conventional hand sifters and those of other types of which I have knowledge.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. A sifter comprising a container, a sieve in said container, means for actuating said sieve, a bin adapted to receive sifted material from said sieve, means for controlling passage of sifted material from said sieve to said bin, said container having an inlet to said sieve, a closure controlling said inlet and adapted to prevent substantial escape of dust from said container during actuation of said sieve, and mechanism positively connected both to said means and to said closure for controlling said means by movements of said closure.

2. A sifter comprising a container, a sieve, a bin removably carried in said container and adapted to receive sifted material from said sieve, means carried by said container for preventing or permitting passage of sifted material from said sieve to said bin, said means being adapted to prevent withdrawal of said bin from said container while permitting passage of sifted material from said sieve to said bin, a closure on said container for permitting supply of material to said sieve when the closure is open and for preventing escape of material into the atmosphere when the closure is closed, and an integrate mechanism actuated by opening and closing movements of said closure to control said means.

3. A sifter comprising a container, a sieve, a removable bin adapted to receive sifted material from said bin, means for controlling passage of sifted material from said sieve to said bin, said means including plates mounted on spaced supports in said container between said sieve and said bin and adapted to engage one another for preventing passage of sifted material or to remain spaced from one another for permitting passage of sifted material, said plates when in their relatively spaced position preventing withdrawal of said bin from said container, means for controlling the relatively engaged and spaced positions of said plates, said container having an inlet to said sieve, a closure for said inlet, and mechanism actuated by said closure to control the last mentioned means.

4. A sifter comprising a container, a sieve, a bin carried in said container and adapted to receive sifted material from said sieve, a partition wall between said sieve and said bin, said wall including movable elements adapted either to form a wall substantially impervious to passage of sifted material or to provide openings for the ready passage of sifted material, said container having an inlet to said sieve, a lid adapted to open said inlet when the sieve is to be charged with material to be sifted and to close said inlet when the sieve is being actuated, crank means for moving the movable wall elements, and mechanism controlled by movements of said lid and adapted to actuate said means.

5. A sifter comprising a container, a sieve, a bin removably carried in said container below said sieve, a partition wall between said sieve and said bin, said wall having elements movable to a substantially horizontal position above said bin or to a substantially vertical position partially within said bin such that removal of said bin from said container is prevented, said container having an inlet to said sieve, a lid for opening or closing said inlet, and an integrate means for controlling the above indicated movements of the movable wall elements to substantially horizontal and vertical positions, said means being actuated by movements of said lid.

6. A sifter comprising a container, a sieve, a removable bin adapted to receive sifted material from said sieve, a partition wall in said container between said sieve and said bin, said wall having elements movable to a substantially horizontal position above said bin to form a wall substantially impervious to sifted material, said elements being also movable to a relatively spaced position partially within said bin to provide openings for ready passage of sifted material to said bin and to prevent removal of said bin from said container, means for controlling the movable wall elements, said container having an inlet to said sieve, a lid for opening or closing said inlet, and mechanism connected to said lid and having a lost motion connection with said means to actuate said means.

7. A sifter comprising a container, a sieve mounted in said container so as to permit of its ready agitation, a removable bin adapted to receive sifted material from said sieve, a partition wall between said sieve and said bin, said wall including wall elements pivotally carried by spaced supports mounted in said container between said sieve and said bin, said wall elements being movable to a relatively spaced position partially within said bin to permit of ready passage of sifted material into said bin and to prevent withdrawal of said bin from said container, said wall elements being also movable to a position entirely without said bin and in engagement with one another to permit removal of said bin from said container and to prevent passage of sifted material from said sieve to said bin, cam means engaging said wall elements to force them into their engaged position, said container having an inlet to said sieve, a lid for opening and closing said inlet, and mechanism controlled by the opening movement of said lid for actuating said cam means to force said wall elements into their engaged position and also controlled by the closing movement of said lid for releasing said cam means from forceful action against said wall elements.

8. A flour sifter comprising a container, a sieve mounted for ready agitation in said container, a bin slidably mounted in said container, means for controlling passage of flour between said sieve and said bin, said means including plates carried by said container between said sieve and said bin, said plates being movable to a relatively spaced position permitting ready passage of flour and also being movable to a relatively engaged position to form a wall substantially impervious to sifted flour, cam means for controlling the movements of said elements, said container having an inlet to said sieve, a lid adapted to open said inlet when the sieve is to be charged with material to be sifted and to close said inlet when the sieve is being agitated, and mechanism connected to said cam means and to said lid for controlling said cam means.

GENZO NAKAHIRO.